United States Patent
Te Strake et al.

(10) Patent No.: US 10,329,833 B2
(45) Date of Patent: Jun. 25, 2019

(54) FIRE PROTECTION GLAZING AND METHOD FOR PRODUCING A FIRE PROTECTION GLAZING

(71) Applicant: Saint-Gobain Glass France, Courbevoie (FR)

(72) Inventors: David Te Strake, Aachen (DE); Udo Gelderie, Würselen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 360 days.

(21) Appl. No.: 14/894,129

(22) PCT Filed: May 26, 2014

(86) PCT No.: PCT/CH2014/000070
§ 371 (c)(1),
(2) Date: Nov. 25, 2015

(87) PCT Pub. No.: WO2014/190444
PCT Pub. Date: Dec. 4, 2014

(65) Prior Publication Data
US 2016/0108661 A1    Apr. 21, 2016

(30) Foreign Application Priority Data

May 29, 2013 (CH) .................................. 1032/13

(51) Int. Cl.
*E06B 5/16* (2006.01)
*B32B 17/10* (2006.01)
(Continued)

(52) U.S. Cl.
CPC ............ *E06B 5/165* (2013.01); *B32B 17/069* (2013.01); *B32B 17/10036* (2013.01); *B32B 17/10311* (2013.01); *C09D 133/26* (2013.01)

(58) Field of Classification Search
None
See application file for complete search history.

(56) References Cited

U.S. PATENT DOCUMENTS 4,264,681 A * 4/1981 Girard .............. B32B 17/10311
                                                        156/106
4,270,600 A * 6/1981 Bourdin ................... C09K 5/06
                                                         126/617
(Continued)

FOREIGN PATENT DOCUMENTS

DE       27 13 849      10/1977
DE       4001677        3/1991
(Continued)

OTHER PUBLICATIONS

3-Dimethyaminopropyl Methacrylamide, NIC, Oct. 2004, pp. 10-13. (Year: 2004).*
European Office Action dated Jan. 5, 2017, Application No. 16187343.5.

*Primary Examiner* — Peter A Salamon
(74) *Attorney, Agent, or Firm* — Rankin, Hill & Clark LLP

(57) ABSTRACT

The fire-protection glazing includes at least two glass panes, between which a transparent layer of a fire-protection layer is arranged, wherein the fire-protection layer includes a hydrogel. The educts of the fire-protection layer include water-soluble, non-toxic monofunctional monomers in an acid environment as well as at least one bifunctional or polyfunctional monomer and, as the case may be, an initiator, in an aqueous salt solution or in an aqueous salt dispersion. The monofunctional and the bifunctional or polyfunctional monomers are not toxic, not carcinogenic and not mutagenic.

18 Claims, 1 Drawing Sheet

(51) Int. Cl.
 C09D 133/26 (2006.01)
 B32B 17/06 (2006.01)

(56) References Cited

U.S. PATENT DOCUMENTS

| | | | | |
|---|---|---|---|---|
| 4,830,913 A | * | 5/1989 | Ortmans | B32B 17/10311 |
| | | | | 428/34 |
| 5,061,748 A | * | 10/1991 | Bolton | B32B 17/10311 |
| | | | | 524/394 |
| 5,223,313 A | * | 6/1993 | Holzer | B32B 17/10311 |
| | | | | 428/192 |
| 5,437,902 A | * | 8/1995 | Itoh | B32B 17/10036 |
| | | | | 428/192 |
| 5,580,661 A | * | 12/1996 | von Bonin | C09K 21/04 |
| | | | | 156/109 |
| 2011/0135896 A1 | * | 6/2011 | Oh | B32B 17/10174 |
| | | | | 428/215 |
| 2015/0000825 A1 | * | 1/2015 | Crook | C08K 5/098 |
| | | | | 156/109 |

FOREIGN PATENT DOCUMENTS

| | | |
|---|---|---|
| DE | 693 16 816 | 2/1999 |
| DE | 03/031173 | 4/2003 |
| DE | 102 37 395 | 8/2003 |
| DE | 20 2012 012 285 | 2/2013 |
| WO | 03/061963 | 7/2003 |

* cited by examiner

FIRE PROTECTION GLAZING AND METHOD FOR PRODUCING A FIRE PROTECTION GLAZING

BACKGROUND OF THE INVENTION

Field of the Invention

The invention concerns the field of fire-protection glazing, and relates to a fire-protection glazing with a transparent fire-protection layer, which is arranged between two transparent carriers (glass panes for example).

Description of Related Art

With a fire-protection glazing with a fire-protection layer arranged between transparent carriers (in particular glass panes), the side of the glass that faces the fire shatters and a foaming and/or hazing of the fire-protection layer sets in, in the case of a fire. The fire-protection layer then acts in a cooling and/or insulating, which is to say reflecting manner. This fire-protection layer, for example, can be constructed on the basis of silicates or on the basis of hydrogels. Both have their advantages and disadvantages.

A fire-retarding glazing based on hydrogels is described, for example in DE 2713849, with which a space between at least two parallel glass panes is filled with a gel. The gel is formed with the polymerisation of methacrylamide and acrylamide, wherein the polymerisation is effected with the help of peroxides or persalts amid the addition of an accelerating agent (e.g. diethyl amino propionitrile) and, as the case may be, a cross-linking agent (e.g. methylene bisacrylamide, MBA).

DE 10237395 describes a method for manufacturing a fire-protection glazing, wherein a fire-protection composition between two adjacent glass panes is produced. The fire-protection composition forms by way of the polymerisation of acrylic acid and/or methacrylic acid and/or their respective alkali salts and/or ammonium salts of acrylic acid, and a salt solution, a polymerisation initiator and a cross-linking agent are thereby additionally used, wherein alkaline (basic) salt solutions are specified as being preferred.

Hydrogels, which have been known until now are partly constructed from toxic or carcinogenic or mutagenic raw materials (e.g. based on acrylamide/DE 2713849) or raw materials (water-soluble monomers) are used, which preferably polymerise in an alkaline environment. High pH-values however can cause undesirable reactions with glass surfaces (glass corrosion) and thus lead to hazing. A further disadvantage of the hydrogels, which have been applied until now, is their poor adhesion to the glass surface. It is particularly on account of the hydrolysis reactions due to high pH-values that chemical bonding to the glass surface is either destroyed or does not even arise in the first place.

Hydrogels, which are manufactured on the basis of methylolacrylamide, are also known. Methylolacrylamide, for example, can be manufactured from the starting materials of acrylamide and formaldehyde, wherein both starting materials are substances that are hazardous with regard to health. They have been graded as SVHC (substance of very high concern). SVHCs are chemical compounds (or part of a group of chemical compounds) that have been identified as having particularly dangerous characteristics under the REACH stipulations (registration, evaluation, authorisation and restriction of chemicals). For this reason, acrylamide is also classed as being carcinogenic and mutagenic, and formaldehyde is classified as toxic and probably cancer-causing.

An exposure of humans to these substances, for example during production or after the shattering of the fire-protection pane in the case of fire is therefore harmful and should be avoided.

Moreover, a special urgency arises when manufacturing fire-protection glazing based on hydrogels, as soon as the polymerisation initiator is added to the educts of the gel, since the cross-linking and thus the curing of the gel begins immediately. This is particularly disadvantageous if the educts or part of the educts is toxic, since activities carried out in a rush are much more prone to mistakes.

SUMMARY OF THE INVENTION

It is therefore the object of the invention, to provide a fire-protection glazing and a method for its manufacture, which overcomes the disadvantages mentioned above.

The fire-protection glazing includes at least two transparent carriers, between which a transparent layer of a fire-protection layer is arranged. The fire-protection layer includes a hydrogel. This hydrogel includes a polymer that is polymerised from at least one water-soluble, non-toxic, monofunctional monomer as well as from at least one bifunctional or polyfunctional monomer, in an acidic environment (pH<7) in an aqueous salt solution or in an aqueous salt dispersion.

Glass panes, in particular flat glass panes, are considered as transparent carriers. Ceramic glasses can also be used, and special bent glass can be applied. Thermally or possibly chemically prestressed glass panes are particularly favourable. Transparent carriers based on polymer (e.g. from polycarbonates or polymethyl methacrylate (PMMA; acrylic glass), partially crystalline glass (ceramic glass) or composite systems with glass panes and plastic carriers, are also considered as alternatives to glass panes based on silicon oxide.

The term "fire-protection glazing" as a result is functional and is not to be understood as being limited to certain materials (specifically: glass in the narrow context), but expressly also includes constructions with transparent or translucent carriers of the above mentioned and other materials.

A hydrogel is a polymer that contains water, but is water-insoluble (but water-compatible), whose monomers are linked into a three-dimensional network. An acidic solution has a pH value <7. The hydrogel is particularly preferably polymerised in a solution with a pH value of less than 6.5, for example a pH value of 6 at the most or for example at a pH-value of 4.7 at the most.

A non-toxic monomer, for example, is a chemical compound which, according to the globally harmonised system of classification and labelling chemicals (GHS, globally harmonised system of classification, labelling and packaging of chemicals) of the United Nations, is not classified in the hazard class "acute toxicity" with the hazard designation toxic (characterising letter: T) or very toxic (characterising letter: T+). The mentioned monofunctional and, for example, also bifunctional or polyfunctional monomers of the fire-protection layer are likewise not classified as carcinogenic (cancer-inducing) and/or mutagenic (genetically harmful).

A recognition or finding, on which the invention is based, is the fact that it is possible for the fire-protection layer to be non-toxic before the conversion into a hydrogel (educts) as well as in the case of the finished converted hydrogel. This has the advantage that the occurrence of toxic compounds is also reduced in the case of fire. A worker who participates in the manufacture of the fire-protection layer, as well as a person in the case of a fire or breakage of the fire-protection panes during use is better projected from poisoning.

Moreover, it becomes possible that the polymerised fire-protection layer has a pH value of less than seven. It has been surprisingly found that significant advantages can be achieved with this. Firstly, the fire-protection layer forms a polar surface. The polarity of the fire-protection layer is influenced by the polarity of the ligands in the polymer chain. This polar surface can efficiently interact with the surface of the glass pane, by which means the adhesion of the fire-protection layer on the glass pane is greatly improved. The improved adhesion can be of great significance, in particular in the case of fire, since the fire-protection layer after a shattering or bursting of the fire-side glass pane remains connected to the further glass pane and does not simply fall into the room with the fire (which would correspond to a total failure of the fire-protection glazing). This improved adhesion is achieved even without the application of additional bonding agents.

Secondly, a further advantage of a fire-protection layer with a pH value <7 is the fact that the glass pane, which comes into contact with the fire-protection layer, is attacked to a lesser extent in an acidic environment in comparison to the state of the art, since a so-called glass corrosion in an acidic environment takes place to a lesser extent than in an alkaline environment. Hazing of the glass and/or of the glass pane, which is inherent of ageing, is prevented by way of this.

Methylene bisacrylamide (MBA) can be used as a bifunctional monomer, for example. The bifunctional or polyfunctional monomer effects or accelerates a three-dimensional cross-linking of the fire-protection layer. By way of this, it is possible for the fire-protection layer to no longer be flowable after the polymerisation. The shape stability of the fire-protection layer and, thus, of the fire-protection glazing is considerably improved by way of this.

The initiation of the polymerisation can be assisted by an initiator. The initiator for example can be a water-soluble UV initiator of a UV radical chain polymerisation (after beaming with ultraviolet radiation).

The initiator (or generally the polymerisation) can advantageously be thermally activated. By way of this, it is possible for only one initiator to be being necessary for initiating the polymerisation of the fire-protection layer. In contrast to this, initiators are known which act as a redox system and have at least two reaction partners. A homogenisation of the educts can be accomplished more simply due to the use of less starting substances/starting materials (educts) for the fire-protection layer, by which means the efficiency of the polymerisation and thus the quality of the fire-protection glazing is improved.

The thermal activation preferably sets in above room temperature (standard room temperature is defined as 23° C.). By way of this, it is possible for polymerisation to not yet take place, even at room temperature, when homogenising the educts (including the initiator). For this reason there is no urgency concerning the careful manufacture of the fire-protection glazing, and this reduces the proneness to mistakes and permits an additional flexibility in the production process.

The fire-protection mass, which forms the fire-protection layer after the polymerisation (i.e. the hydrogel, possibly with additives), thus in particular is designed such that essentially no polymerisation takes place at room temperature. "Essentially no polymerisation", for example, can mean that the viscosity of the hydrogen does not reach nor does it exceed a value of 200 mPa s within 12 hours. In other words: the educts of the fire-protection layer do not cure within an acceptable time period (approx. 12 hours) unless they undergo a thermal activation.

Advantageously, the activation temperature for the initiation of the polymerisation lies below 100° C. A bubble formation in the fire-protection layer due to possibly evaporating water is prevented by way of this. It can be advantageous for example if the polymerisation starts at a temperature of 40° C. to 75° C. The lowest temperature, at which the viscosity of the freshly mixed-together mass increases by a factor of 1000 within one to two hours, i.e. reaches a viscosity of 400 mPas s can be seen as the activation temperature. The fire-protection layer can no longer be processed or hardly at all and can then hardly flow any more at a viscosity of 400 mPa s and more.

One can do without a reaction partner for the initiator if only a single initiator is used for the initiation of a polymerisation of the fire-protection layer. Accordingly, when composing the fire protection layer, one no longer needs to consider the adjustment of a redox system, as for example an excess of one reaction partner can lead to undesirable side-reactions.

A persalt can be applied as an initiator, and in particular peroxide sulphates are well suited for initiating the polymerisation. Persalts are salts of a peracid, wherein the term peracid is a collective term. Peracids are to be understood as oxoacids of a higher oxygen content as well as peroxo acids and also peroxycarboxylic acids. Persalts are strong oxidants which in a redox system with a reduction agent can initiate the radical reaction of the educts of the hydrogel into a polymer. Peroxide sulphates in particular can also be thermally activated.

A further significant advantage is the fact that the activation can take place in a targeted manner if the educts of the fire-protection layer are situated at their designated location, for example, between the at least two glass panes. The processing such as, for example, the mixing and homogenisation of the educts as wells the filling of the educts between the at least two glass panes can be carried out with due care and attention and without any hurry by way of this. The quality of the fire-protection glazing can therefore be ensured at a high level and in a reproducible manner.

Moreover—and this concerns different embodiments of the invention, not only with thermal activation—the at least two glass panes of the fire-protection glazing can include a layer of organofunctional silane at the side which faces the fire-protection layer. The organofunctional silane can be deposited onto the glass pane for example by way of spraying on, a roller application or wiping on.

By way of this, it is possible that the adhesion of the fire-protection layer on the glass pane can be improved even further. The further improved adhesion has an advantageous effect on the fire-protection properties of the fire-protection glazing, since the fire-protection layer in the case of a fire after a shattering of the glass pane facing the fire remains bonded on the at least one remaining glass pane and provides a thermal insulation. The organofunctional silane can also be called a functionalised silane.

The layer of organofunctional silane is advantageously a monomolecular layer. This can be realised with the help of a greatly diluted solution of the functionalised silane in a highly volatile solvent, such as propanol or isopropanol for example, or a propanol-water mixture. A direct and stable connection to the glass pane can be created by way of the monomolecular layer since no intermediate layers compromise this connection.

The organofunctional silane can moreover form a covalent bond with the fire-protection layer. Such a covalent bond in contrast to purely polar interactions can only be broken by application of a high amount of energy. The fire-protection layer adheres to the coated glass pane particularly well on account of this. A huge amount of thermal energy is present in the case of a fire, by which means on the one hand the covalent bonding between the fire-protection layer and the functionalised silane on the side facing the fire can be broken, and the possibly shattering glass pane can detach from the fire-protection layer. On the other hand, the bonding between the fire-protection layer and the functional silane on the side that is away from the fire is retained, by which means the thermal insulation of the fire-protection glazing continues to be maintained.

Not only can the initiated polymerisation take place within the fire-protection layer but also spill over onto the functionalised silane, in the case that the organofunctional silane includes at least a double bond on the side that is away from the glass pane. The fire-protection layer adheres particularly well to the glass pane due to this cross-linking between the fire-protection layer and functionalised silane and thus with the glass pane, and this entails the already mentioned advantages. Such a functionalised silane with at least one double bond can for example be a vinyl silane.

The water-soluble, non-toxic monomers, from which fire-protection layer is converted, in a group of embodiments include at least acrylic acid or an acrylic acid derivative and methacrylamide or a derivative of methacrylamide. One can make do without the use of toxic acylamide by way of this, and it can be ensured that the completely converted hydrogel is not toxic and the occurrence of toxic substances can be greatly reduced in the case of fire, as has already been mentioned.

The fire-protection layer before conversion can include a share of 5-20 percent by weight of monomers. A good three-dimensional crosslinking can be ensured by way of this, by which means the shape stability of the fire-protection layer is significantly improved. The share of monomers in particular can also be between 7 and 15 percent by weight of the fire-protection layer before a conversion, where the cross-linking is particularly good. Thereby, it is advantageous that the monomers comprise acrylic acid or an acrylic acid derivative as well as a methacryalmide or a derivative of methacryalide. It is possible to improve the three-dimensional cross-linking of the fire-protection layer by way of this. In this case, thus with regard to the share of acrylic acid and/or acrylic acid derivative plus methacrylamide and/or a methacrylamide derivative, it is the case that the share lies between 5 and 20% (details in each case in percent by weight), preferably between 7 and 15%, particularly preferably between 8 and 12%. The ratio between methacyclamide and/or a methacrylamide derivative on the one hand and acrylic acid and/or acrylic acid derivative on the other hand lies between 0.5 and 2.5, in particular between 0.8 and 1.5, particularly preferably between 1 and 1.2.

Regarding the shares of further components of the fire-protection mass, it is the case of:
- a water share between 60-90%, preferably between 70-85%, in particular between 75-82%.
- salt (for example NaCl or another alkali salt or earth alkali salt) 0-20%, preferably at least 5%, particularly preferably between 5 and 15%, in particular between 8 and 13%.
- lye (for example NaOH or KOH or potassium carbonate etc.) preferably maximal 5%, in particular between 0 and 4% or between 0.8 and 2.5%, for example between 1% and 2%.
- bifunctional or polyfunctional monomer (for example methylene bisacrylamide MBA) for example maximal 1.5%, in particular between 0% or 0.05% and 0.5% or between 0.07% and 0.25%. The molar ratio between monofunctional monomer(s) on the one hand and bifunctional or polyfunctional monomer on the other hand for example is between 40 and 1000, in particular between 70 and 300.
- Initiator: for example maximal 1%, in particular between 0.05% and 0.4% or between 0.07% and 0.25%.

The fire-protection layer can have a pH value of smaller than 7, also after the polymerisation. The adhesion on the glass is assisted due to polar interactions by way of this. A layer of organofunctional silane is not absolutely necessary on the side facing the fire-protection layer for the improvement of the adhesion. A degeneration of the bonding between the fire-protection layer and a possibly deposited layer of functionalised silane can occur in an alkaline (basic) environment (pH >7), by which means the adhesion or bonding on the glass pane is reduced in a basic environment. Moreover, the so-called glass corrosion is reduced in an acid environment (pH <7), by which means the fire-protection glazing displays an improved ageing resistance.

The method for manufacturing a fire-protection glazing comprises the following steps:
- providing a fire-protection mass with water-soluble, non-toxic monomers as well as at least one bifunctional or polyfunctional monomer and with at least one initiator, in an aqueous salt solution or in an aqueous salt dispersion, in an acid environment;
- providing at least one first transparent carrier (for example, a glass pane) and at least one edge limitation, which is peripheral along the edge of the first carrier, such that the first carrier and the edge limitation form a receptacle;
- filling the fire-protection mass into the receptacle; and
- controlled starting of a polymerisation of the fire-protection into a hydrogel fire-protection layer.

The receptacle according to a first possibility can be formed by the first transparent carrier and additionally by a second transparent carrier (for example likewise a glass pane) with a peripheral edge sealing, wherein the edge sealing is interrupted at least at one location, in order to form a filling opening. The edge sealing is completed after the filling, to the extent that the filling opening is closed. This method has the advantage that space-saving arrangements of several fire-protection glazing are possible even during manufacture. One possible example of such a filling step is taught for example in WO 03/031173 (for a fire-protection mass which is different to that in the method according to the invention).

According to a further embodiment, one should not completely rule out that the first transparent carrier (glass pane or likewise) with a peripheral edge limitation being able to be deposited horizontally, so that the receptacle is formed in the manner of a tip by way of the carrier and edge limitation, and filled. The fire-protection mass can subsequently be cured and, as the case may be, thereby also dried, whereupon a second transparent carrier is applied thereon and an edge sealing attached if required (the edge sealing can also be formed at least partly by the edge limitation which then remains on the first carrier). An attachment of the second carrier before or during the curing is also possible. This method amongst other things can be carried out under protective glass, so that no air oxygen can inhibit the polymerisation.

By way of this procedure, it is possible for the polymerisation to be able to be started in a controlled manner not until the educts of the fire-protection layer are homogenised and are in contact at least with the first carrier in situ. The working steps on manufacturing the fire-protection glazing can be carried out with improved care and attention by way of this, by which means the reproducibility of the quality can be ensured.

The controlled starting of the polymerisation can be initialised by way of heating the fire-protection layer. A homogeneous polymerisation of the fire-protection layer, for example in the space between the at least two glass panes is ensured by way of this. Thereby, the temperature, as already mentioned, cannot be selected to high, so that a bubble formation in the fire-protection layer is prevented.

One possible additional step relates to embodiments, in which the carrier is designed as a glass pane (prestressed or non-prestressed or laminated glass). According to this step, a layer of organofunctional silane can be deposited onto the glass pane or at least one of the glass panes, on the side facing the fire-protection layer, before the respective glass pane comes into contact with the fire-protection mass. The adhesion of the fire-protection layer on the glass pane is strengthened by way of this, by which means the fire-protection characteristics of the fire-protection glazing are improved.

Of course not only can the procedure according to the invention be applied to fire-protection glazing with two transparent carriers and a fire-protection layer therebetween, but to any constructions with transparent carriers and a fire-protection layer, in particular also constructions with more than two carriers and more than one fire-protection layer.

Further embodiments are to be deduced from the dependent claims. Thereby, the features of the method claims with regard to context can be combined with those of the device claims and vice versa.

BRIEF DESCRIPTION OF THE DRAWINGS

The subject-matter of the invention is hereinafter described in more detail by way of preferred embodiments which are represented in the accompanying drawings. In each case in a schematic manner are shown in.

DETAILED DESCRIPTION OF THE INVENTION

Figure 1A:
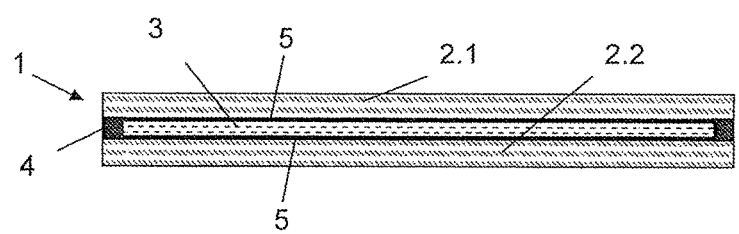
FIGS. 1a and 1b different constructions of a fire-protection glazing.

Basically, the same or analogous parts are provided with the same reference numerals in the figures.

Figure 1B:
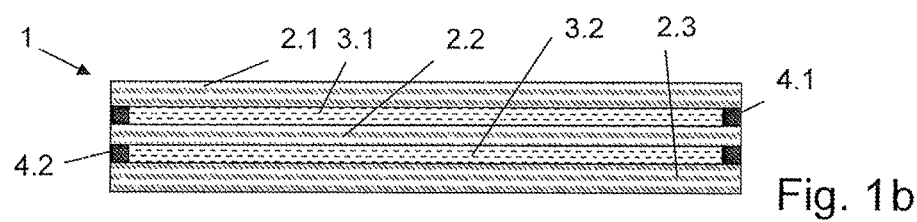

FIGS. 1a and 1b schematically show the construction of a fire-protection glazing 1, which comprises a fire-protection layer 3 based on a hydrogel. The figures show:

FIG. 1a: a fire-protection glazing 1 with two glass panes 2.1, 2.2 with a fire-protection layer 3 arranged therebetween with an edge sealing 4. The fire-protection glazing can be manufactured, for example, by way of curing the educts of the fire-protection layer 3, which are firstly filled in fluid form into the intermediate space defined with the help of the edge sealing 4 (edge compound), between the glass panes 2.1, 2.2 and are thermally cured there. The glass panes 2.1, 2.2 at the side which faces the fire-protection layer 3 have a layer of organofunctional silane 5. This layer of organofunctional silane 5 can alternatively also be deposited only onto one of the two glass panes.

FIG. 1b: a fire-protection glazing 1 with three glass panes 2.1, 2.2, 2.3 with fire-protection layers 3.1, 3.2 arranged therebetween, and here are each with an edge sealing 4.1, 4.2. Fire-protection glazing 1 with more than three glass panes 2.1, 2.2, 2.3 and more than two fire-protection layers 3.1, 3.2 are also possible.

Constructions with more than three glass panes, more than two fire-protection layers and/or with other transparent carriers as glass panes and/or with additional transparent layers are possible—as described in DE 20 2021 012 285.1.

A few examples for the manufacture of a fire-protection glazing 1 are specified hereinafter.

EXAMPLE 1

A fire-protection mass is mixed from the following components:

| | |
|---|---|
| 5.42 w[%] | methacrylamide |
| 4.58 w[%] | acrylic acid |
| 0.17 w[%] | methylene bisacrylamide (MBA) |
| 10.00 w[%] | NaCl |
| 1.50 w[%] | NaOH |
| 78.16 w[%] | water |
| 0.17 w[%] | initiator (peroxide sulphate) |

EXAMPLE 2

Firstly, the educts of the fire-protection layer 3 are mixed into a fire-protection mass with the following weight by percent:

| | |
|---|---|
| 5.4 w[%] | methacrylamide |
| 4.6 w[%] | acrylic acid |
| 0.15 w[%] | methylene bisacrylamide (MBA) |
| 2.5 w[%] | KCl |
| 0.10 w[%] | NaOH |
| 87.1 w[%] | water |
| 0.15 w[%] | initiator (peroxide sulphate) |

The pH value of this acidic mixture is about 4.5. The mixture is subsequently filled into the space which is delimited by the edge sealing between two glass panes. A polymerisation is initiated during a time of 400 minutes in a furnace at 60° C., and the fire-protection layer cures between the two glass panes Example Silanisation 2 g of vinyl silane (vinyl triethoxysilane) was dissolved in 100 ml of a 1/1 water/propanol mixture. The solution is sprayed onto two cured glass panes. A first glass pane is connected to a second glass pane via an edge sealing (edge unit) after a drying time of 5 minutes. The mixture of the educts of the fire-protection layer 3 and which is specified in Example 1 is filled in the thus arisen cavity.

The unit filled with the fire-protection layer is heated at 55° C. for 500 minutes in a furnace. The polymerisation of the educts of the hydrogel is initiated by the heating and the fire-protection layer cures in intermediate space of the panes.

The invention claimed is:

1. A fire-protection glazing with at least two transparent carriers, between which a transparent fire-protection layer is arranged,
   wherein the fire-protection layer comprises a hydrogel,
   wherein the hydrogel comprises a polymer that is polymerised from at least one monofunctional monomer as well as at least one bifunctional or polyfunctional monomer,
   wherein the polymer is polymerised from the monomers in an aqueous salt solution or in an aqueous salt dispersion, and
   wherein the polymer is polymerised from the monomers in an acidic environment.

2. The fire-protection glazing according to claim 1, wherein an initiator is additionally present during the polymerisation of the polymer from the monomers.

3. The fire-protection glazing according to claim 1, wherein the polymerisation of the polymer from the monomers is thermally activated.

4. The fire-protection glazing according to claim 3, wherein the thermal activation sets in above room temperature.

5. The fire-protection glazing according to claim 3, wherein an activation temperature for the initiation of the polymerisation lies below 80° C.

6. The fire-protection glazing according to claim 5, wherein the activation temperature lies in a region of 25° C. to 80° C.

7. The fire-protection glazing according to claim 1, wherein the monomers are not toxic, not carcinogenic and not mutagenic.

8. The fire-protection glazing according to claim 1, wherein the initiator is a peroxide sulphate.

9. The fire-protection glazing according to claim 1, wherein the activation of the initiator takes place when the fire-protection layer is located between the at least two glass panes.

10. The fire-protection glazing according to claim 1, wherein the at least two glass panes comprise a layer of organofunctional silane on a side which faces the fire-protection layer.

11. The fire-protection glazing according to claim 10, wherein the layer of organofunctional silane is a monomolecular layer.

12. The fire-protection glazing according to claim 10, wherein the organofunctional silane is covalently bound to the fire-protection layer.

13. The fire-protection glazing according to claim 10, wherein the organofunctional silane comprises at least one double bond on the side which is away from the glass pane, wherein the organofunctional silane is a vinyl silane.

14. The fire-protection glazing according to claim 1, wherein the monofunctional monomers comprise at least acrylic acid or an acrylic acid derivative and methacrylamide or a derivative of methacrylamide.

15. The fire-protection glazing according to claim 14, wherein the monofunctional monomers have a share of 5-20 percent by weight of the educts of the fire-protection layer.

16. The fire-protection glazing according to claim 14, wherein the polymerised fire-protection layer has a pH value of smaller than 7.

17. The fire-protection glazing according to claim 5, wherein the activation temperature lies in a region of 40° C. to 75° C.

18. The fire-protection glazing according to claim 14, wherein the monofunctional monomers have a share of 7-15 percent by weight of the educts of the fire-protection layer.

* * * * *